United States Patent
Zhao

(10) Patent No.: US 12,061,747 B1
(45) Date of Patent: Aug. 13, 2024

(54) KEYBOARD WITH KEY POSITION LAYOUT AND INPUT METHOD THEREOF APPLIED TO ELECTRONIC DEVICE

(71) Applicant: MIHUAN TECHNOLOGY (CHANGCHUN) CO., LTD., Changchun (CN)

(72) Inventor: Misheng Zhao, Changchun (CN)

(73) Assignee: MIHUAN TECHNOLOGY (CHANGCHUN) CO., LTD., Changchun (CN)

( * ) Notice: Subject to any disclaimer, the term of this patent is extended or adjusted under 35 U.S.C. 154(b) by 0 days.

(21) Appl. No.: 18/307,996

(22) Filed: Apr. 27, 2023

(51) Int. Cl.
| | |
|---|---|
| G06F 3/048 | (2013.01) |
| G04G 21/00 | (2010.01) |
| G06F 3/01 | (2006.01) |
| G06F 3/023 | (2006.01) |
| G06F 3/038 | (2013.01) |
| G06F 3/0488 | (2022.01) |
| G06F 3/04886 | (2022.01) |
| G06F 3/04895 | (2022.01) |

(52) U.S. Cl.
CPC .............. *G06F 3/018* (2013.01); *G04G 21/00* (2013.01); *G06F 3/04886* (2013.01); *G06F 3/04895* (2013.01); *G06F 2203/04808* (2013.01)

(58) Field of Classification Search
CPC .. G06F 3/018; G06F 3/04886; G06F 3/04895; G06F 2203/04808; G04G 21/00
See application file for complete search history.

(56) References Cited

U.S. PATENT DOCUMENTS

| | | | |
|---|---|---|---|
| 6,590,566 B2* | 7/2003 | Abe | G06F 3/016 345/169 |
| 2008/0062015 A1* | 3/2008 | Bowen | G06F 3/0234 341/22 |
| 2014/0292727 A1* | 10/2014 | Kamata | G06F 3/0418 345/178 |
| 2014/0329593 A1* | 11/2014 | Akkarakaran | A63F 13/533 463/31 |
| 2017/0206004 A1* | 7/2017 | De Bruyn | G06F 3/04883 |
| 2021/0157415 A1* | 5/2021 | Lin | G06F 3/04886 |

\* cited by examiner

*Primary Examiner* — Md Saiful A Siddiqui
(74) *Attorney, Agent, or Firm* — Zhigang Ma

(57) ABSTRACT

The present invention discloses a keyboard with a key position layout and an input method thereof applied to an electronic device. The keyboard with the key position layout includes a keyboard body, where the keyboard body is provided with a main key area formed by nine keys, and twenty-eight letter key positions are arranged within the main key area, and used for displaying twenty-eight input method letters. The input method letters are Chinese phonetic letters, calligraphical code letters, or English Latin letters. On virtual keys of a virtual keyboard, the input method letters on the letter key positions are dynamically replaced to display an input method which is currently used.

11 Claims, 18 Drawing Sheets

| Original scheme | New scheme | Name | Print form | Handwriting |
|---|---|---|---|---|
| A | A | The Chinese character 'a' | I | |
| B | B | The Chinese character 'bo' | C | |
| C | C | The Chinese character 'ci' | U | |
| D | D | The Chinese character 'de' | ⊙ | |
| E | E | The Chinese character 'e' | I | |
| F | F | The Chinese character 'fo' | . | |
| G | G | The Chinese character 'ge' | ⊃ | |
| H | H | The Chinese character 'he' | : | |
| I or Y | I | The Chinese character 'yi' | i | |
| J | J | The Chinese character 'ji' | S | |
| K | K | The Chinese character 'ke' | J | |
| L | L | The Chinese character 'le' | ⊤ | |
| M | M | The Chinese character 'mo' | = | |
| N | N | The Chinese character 'ne' | ÷ | |
| O | O | The Chinese character 'o' | I | |
| P | P | The Chinese character 'po' | L | |
| Q | Q | The Chinese character 'qi' | ⊂ | |
| R | R | The Chinese character 'ri' | I | |
| S | S | The Chinese character 'si' | - | |
| T | T or NG | Final tail of the Chinese character 'te' or 'ang' | I | |
| U or W | U | The Chinese character 'wu' | I | |
| ZH | V | The Chinese character 'zhi' | 2 | |
| CH | W | The Chinese character 'chi' | ⊃ | |
| X | X | The Chinese character 'xi' | : | |
| SH | Y | The Chinese character 'shi' | : | |
| Z | Z | The Chinese character 'zhi' | O | |
| Ü | Ü | The Chinese character 'yu' | i | |
| ER | Ë | The Chinese character 'er' | I | |
| | | Ligature ending | | |

Chinese pinyin letters → New word

FIG. 1

| New word | | Tone |
|---|---|---|
| Print form | Handwriting | |
| ‒ | *e* | Flat tone |
| Λ | *a* | Rising tone |
| X | *a* | Falling-rising Tone |
| V | *e* | Falling tone |
| ! | *a* | Neutral Tone |

FIG. 2

|   | | I The Chinese character 'yi' i | U The Chinese character 'wu' I | Ü The Chinese character 'yu' i |
|---|---|---|---|---|
| A | The Chinese character 'a' I | IA The Chinese character 'ya' ii | UA The Chinese character 'wa' II | |
| O | The Chinese character 'o' I | | UO The Chinese character 'wo' II | |
| E | The Chinese character 'e' I | IE The Chinese character 'ye' ii | | Ü The Chinese character 'yue' II |
| AI | The Chinese character 'ai' Ii | | UAI The Chinese character 'wai' IIi | |
| EI | The Chinese character 'ei' Ii | | UI The Chinese character 'wei' IIi | |
| AO | The Chinese character 'ao' II | IO The Chinese character 'yao' iII | | |
| OU | The Chinese character 'ou' II | IU The Chinese character 'you' iII | | |
| Ë | The Chinese character 'er' I | | | |
| AN | The Chinese character 'an' I⁻ | IAN The Chinese character 'yan' iI⁻ | UAN The Chinese character 'wan' II⁻ | ÜAN The Chinese character 'yuan' iII⁻ |
| EN | The Chinese character 'en' I⁻ | IN The Chinese character 'yin' iI⁻ | UN The Chinese character 'wen' I⁻ | ÜN The Chinese character 'yun' iI⁻ |
| AT | The Chinese character 'ang' It | IAT The Chinese character 'yang' iIt | UAT The Chinese character 'wang' IIt | |
| ET | The Chinese character 'eng' It | IT The Chinese character 'ying' iIt | UT The Chinese character 'weng' IIt | |
| OT | The Chinese character 'hong' It | IOT The Chinese character 'yong' iIt | | |

FIG. 3

| Pronunciation part | | Oral cavity | | | Pharyngeal cavity |
|---|---|---|---|---|---|
| | | Front | Center | Rear | |
| Self-location | High lingual surface | D<br>↑<br>← T →<br>↓ | J<br>↑<br>I ← Q → N<br>↓<br>X | | |
| | Tongue tip | B<br>↑<br>U ← P → M<br>↓<br>F | | G<br>↑<br>E ← K → T<br>↓<br>H | |
| | Low lingual surface | Z<br>↑<br>← C →<br>↓<br>S | V<br>↑<br>R ← W → L<br>↓<br>Y | | |
| Original location | | | | | ↑<br>A ← →<br>↓ |
| Tone tuning method | The Chinese character 'bao'<br>↑<br>The Chinese character 'kai' ← The Chinese character 'po' → The Chinese character 'bi'<br>↓<br>The Chinese character 'ca' | | | | |

FIG. 4

| | | |
|---|---|---|
| 26<br>27  28  29<br>30 | 1<br>2  3  4<br>5 | 31<br>32  33  34<br>35 |
| 6<br>7  8  9<br>10 | 11<br>12  13  14<br>15 | 16<br>17  18  19<br>20 |
| 36<br>37  38  39<br>40 | 21<br>22  23  24<br>25 | 41<br>42  43  44<br>45 |

KEYBOARD WITH KEY POSITION LAYOUT AND INPUT METHOD THEREOF APPLIED TO ELECTRONIC DEVICE

TECHNICAL FIELD

The present invention relates to the technical field of keyboard layouts and input methods, and in particular to a keyboard with a key position layout and an input method thereof applied to an electronic device.

BACKGROUND

With the development of technology, smart watches are increasingly used. Currently, input methods for the watches include a TouchOne keyboard, an Analog Keyboard input method, an Apple Watch Baidu input method, and so on. An English Qwerty keyboard is not suitable for being manipulated while being applied to the watches, and is basically not suitable for the watches. Chinese phonetic input methods are entirely based on a Chinese phonetic scheme in 1958, and the scheme includes four two-letter sounds ZH, CH, SH, and NG, there are also two vowels I and U, I or U needs to be added or replaced with Y or W while being a starting sound in a syllable, there is also Ü in addition to twenty-six English Latin letters, an English syllable-dividing mark, as well as a four-tone tone tuning method that cannot be widely used, and the scheme is relatively complex to operate, and not suitable for small-page operation. Therefore, there is an urgent need for a keyboard with a key position layout and an input method thereof applied to an electronic device to solve the above problems.

SUMMARY

The technical purpose to be achieved by the present invention is to overcome the above technical problems, provide a keyboard with a key position layout and an input method thereof applied to an electronic device, so that platforms such as watches have new key position layouts and input manners, and have low learning costs.

In order to solve the above technical problems, the present invention provides the keyboard with the key position layout including a keyboard body. The keyboard body is provided with a main key area formed by nine keys, and the nine keys are arranged in an array of three rows and three columns, and each key is divided into seven key positions, and from top to bottom, and from left to right, and the seven key positions sequentially are an upper natural number key position, a left natural number key position, a middle natural number key position, a right natural number key position, a C key position, a D key position, and a lower natural number key position. In the main key area, there are totally twenty-eight letter key positions, that is, all the natural number key positions of the five keys arranged in a cross shape, and the middle natural number key positions of the other three keys, and the twenty-eight letter key positions are used for displaying twenty-eight input method letters and correspond to each other one by one.

According to the keyboard with the key position layout, input method letters are Chinese phonetic letters, calligraphical code letters, and English Latin letters, and on virtual keys of a virtual keyboard, the Chinese phonetic letters, calligraphical code letters, and English Latin letters on letter key positions are dynamically replaced to display the input method which is currently used.

Seven key positions occupy seven partitions. A location of the upper natural number key position is called an upper partition. A location of the left natural number key position is called a left partition. A location of the middle natural number key position is called a middle partition. A location of the right natural number key position is called a right partition. A location of the C key position is called a middle-left-lower partition. A location of the D key position is called a middle-right-lower partition. A location of the lower natural number key position is called a lower partition.

After one key of input method letters is input, and the remaining empty upper, left, right, lower or middle right lower partitions except upper, left, right, lower or middle right lower partitions where the 28 input method letters, a determining mark, a space mark, a backspace mark and a syllable-dividing mark are located are used as candidate columns to display words or phrases searched through various input methods.

The content displayed by the middle natural number key position of each key is input and realized through single clicking for the key. The content displayed by the upper natural number key position of each key is input and realized through pressing the key and holding the key to slide up. The content displayed by the left natural number key position of each key is input and realized through pressing the key and holding the key to slide left. The content displayed by the right natural number key position of each key is input and realized through pressing the key and holding the key to slide right. The content displayed by the lower natural number key position of each key is input and realized by pressing the key and holding the key to slide down. The content displayed by the C key position of each key is a key-combining function key, and a predetermined key-combining function is realized through long pressing for the key and single clicking for other related keys. The content displayed by the D key position of each key is input and realized through long pressing for the key.

As an improvement, in a Chinese phonetic full-spelling and syllable-dividing mark input mode, and after a first key is input for each syllable, and twenty-eight letters are individually formed into syllables, of which twenty-seven letters are spelled together with a single vowel, single vowel parts are omitted, the case is called no-pre-spelling, and syllable-dividing marks need to be manually input. Words searched through inputting the letters ü, o, v, w, y or r are displayed in four candidate columns of a key Ü.

Words searched through inputting the letters j, i, q, n, x, z, c or s are displayed in five candidate columns of a key I.

Words searched through inputting the letters b, u, p, m or f are displayed in five candidate columns of a key U.

Words searched through inputting the letter a are displayed in five candidate columns of a key A.

Words searched through inputting the letters g, e, k, h, d, t or l are displayed in five candidate columns of a key E.

After another letter ë is input, ë does not be spelled with other speeches, and a syllable is completed, and a syllable-dividing mark is automatically added. The searched one-tone words are displayed in the four candidate columns of the key Ü. The searched two-tone words are displayed in the four candidate columns of a key O. The searched three-tone words are displayed in the four candidate columns of a key Ë. The searched four-tone words are displayed in the four candidate columns of a space key. The searched five-tone words are displayed in the middle-right-lower candidate columns of the keys I, U, A, and E.

As an improvement, in a Chinese phonetic full-spelling and syllable-dividing mark input mode, and after a first key is input for each syllable, and the inputted letter is fully spelled with another letter, and the case is called pre-full-spelling. Words searched through pre-full-spelling with ü or o are displayed in the four candidate columns of the key Ü.

Words searched through pre-full-spelling with i are displayed in the five candidate columns of the key I.

Words searched through pre-full-spelling with u are displayed in the five candidate columns of the key U.

Words searched through pre-full-spelling with a are displayed in the five candidate columns of the key A.

Words searched through pre-full-spelling with e are displayed in the five candidate columns of the key E.

Words searched through pre-full-spelling with n are displayed in the four candidate columns of the key Ë.

Words searched through pre-full-spelling with t are displayed in the four candidate columns of a key R.

As an improvement, in a Chinese phonetic full-spelling and syllable-dividing mark input mode, and a second key is input for each syllable, and a syllable-dividing mark is manually input through the second key, and a five-tone display mode is applied to the case.

After two keys are input, and if there is further full-spelling, and a pre-full-spelling display mode is applied to the case.

A syllable-dividing mark is automatically added after the second key is input, and a five-tone display mode is applied to the case.

After a third key is input for each syllable, the case is similar to the case after the second key is input for each syllable, and After a fourth key is input for each syllable, a syllable-dividing mark is automatically added, and a five-tone display mode is applied to the case.

As an improvement, in a Chinese phonetic full-spelling and five-tone input mode, a flat tone mark or 1 is displayed in the upper candidate column of the key O, and a rising tone mark or 2 is displayed in the left candidate column of the key O, and the falling-rising tone mark or 3 is displayed in the right candidate column of the key O, and the falling tone mark or 4 is displayed in the lower candidate column of the key O, and finals displayed in the four candidate columns in the full-spelling and syllable-dividing mark input mode are replaced.

As an improvement, in a Chinese phonetic simplified-spelling input mode, regardless of the key input for each syllable, words are displayed in all the empty candidate columns in a phrase frequency order.

As an improvement, in the case of Chinese phonetic full-spelling input, and when words exceed a certain number of syllables, regardless of the no-pre-spelling display mode, the five-tone display mode, or the pre-full-spelling display mode, the words cannot be completely displayed in the left candidate columns, the right candidate columns, and the middle-right-lower candidate columns, but are displayed in the upper candidate columns and the lower candidate columns, and in the phrase frequency order, the upper candidate columns are 1, and the lower candidate columns are 2.

As an improvement, in the case of calligraphical code input, full-spelling or simplified-spelling is determined at first, and words are searched according to word and phrase frequency, and the words with high word and phrase frequency are prioritized to be displayed. Regardless of full-spelling and simplified-spelling, the words are displayed in all the empty candidate columns in a word and phrase frequency order.

As an improvement, in the case of English input, and after a letter is input through one key, English words starting with the letter are searched according to word frequency, and the words with high word frequency are prioritized to be displayed. Subsequent letter strings of the input letter are displayed in all the empty candidate columns in a word frequency order.

As an improvement, regardless of Chinese phonetic simplified-spelling input, calligraphical code simplified-spelling or full-spelling input and English input, and when words exceed a certain number of Chinese characters or letters, and the words cannot be completely displayed in the left candidate columns, the right candidate columns, and the middle-right-lower candidate columns, but are displayed in the upper candidate columns and the lower candidate columns.

After the above method is adopted, the present invention has the following advantages:

I. The Chinese phonetic input method based on the new Chinese phonetic scheme simplifies phonetic, realizes convenient Chinese phonetic input in equipment such as watches, and has the advantages of being easy to learn, high in input efficiency, and low in error rate.

II. The unified twenty-eight Chinese phonetic letters, English Latin letters, and calligraphical code letters are used, and switching among the three kinds of letter is facilitated.

III. An existing candidate column manner is canceled, related key positions of some keys are changed into candidate columns, and a number of candidate words and phrases is increased significantly, so that faster input is achieved.

The above overview is for the purpose of the specification only, and is not intended to be limited in any manner. In addition to the illustrative aspects, implementation manners, and features described above, further aspects, implementation manners, and features of the present invention will be readily apparent by reference to the drawings and the following detailed description.

BRIEF DESCRIPTION OF DRAWINGS

FIG. 1 is a schematic diagram of a comparison table of Chinese phonetic letters and new characters of the present invention.

FIG. 2 is a schematic diagram of a five-tone letter table of a new Chinese phonetic scheme of the present invention.

FIG. 3 is a schematic diagram of a final table of the new Chinese phonetic scheme of the present invention.

FIG. 4 is a schematic diagram of a Chinese speech classification table of the present invention.

FIG. 9 is a schematic diagram of number codes of natural number key positions of keys on a nine-key keyboard in examples of the present invention.

FIG. 18 is a schematic diagram of a word and phrase frequency order of simplified-spelling or full-spelling in a calligraphical code input method of the nine-key keyboard.

FIG. 20 is a schematic diagram of a word and phrase frequency order in an English input method of the nine-key keyboard.

Figure 5:
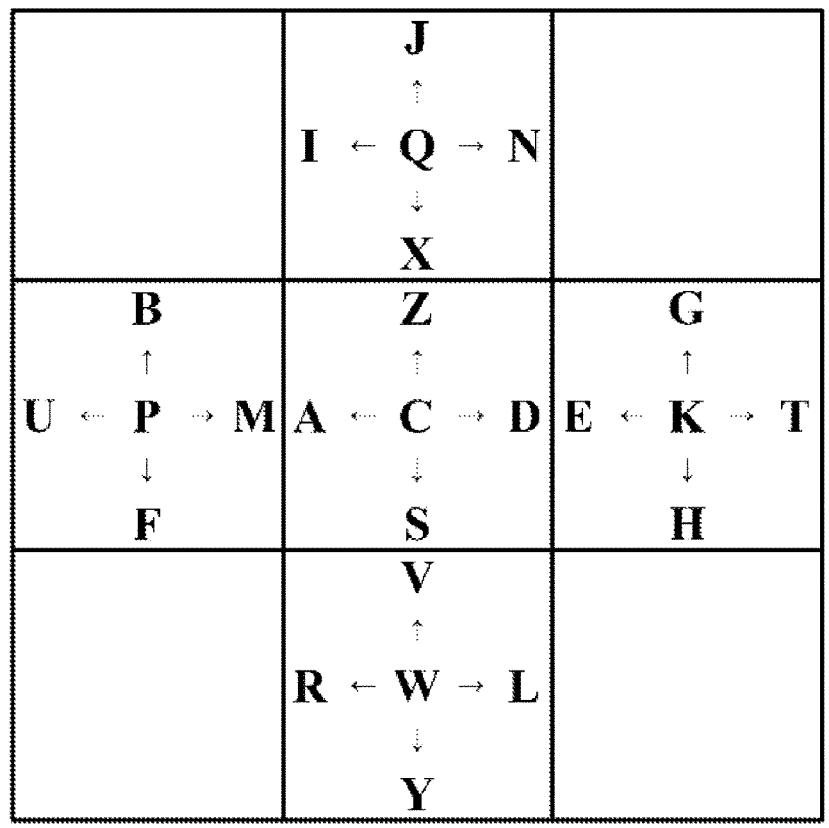
FIG. 5 is a schematic diagram of a transformation of orientations of phonemes in the Chinese speech classification table of the present invention into related orientations in a nine-key layout.

In order to describe the technical solutions in the examples of the present application or in the prior art more clearly, the drawings that need to be used in the description of the examples or the prior art are briefly introduced below. Apparently, the drawings in the description below show merely some examples of the present application, and those of ordinary skill in the art may also acquire other drawings according to these drawings without any creative efforts.

DETAILED DESCRIPTION OF THE EMBODIMENTS

Only some exemplary examples are briefly described below. As those skilled in the art may recognize, the described examples may be modified in various manners, without departing from the spirit or scope of the present invention. Therefore, the drawings and description are considered to be exemplary rather than limited in nature.

The examples of the present invention are described in detail below in conjunction with the drawings.

Referring to FIG. 1 to FIG. 20, a keyboard with a key position layout includes a keyboard body. The keyboard body is provided with a main key area formed by nine keys, and the nine keys are arranged in an array of three rows and three columns, and each key is divided into seven key positions, and from top to bottom, and from left to right, and the seven key positions sequentially are an upper natural number key position, a left natural number key position, a middle natural number key position, a right natural number key position, a C key position, a D key position, and a lower natural number key position. In the main key area, there are totally twenty-eight letter key positions, that is, all the natural number key positions of the five keys arranged in a cross shape, and the middle natural number key positions of the other three keys, and the twenty-eight letter key positions are used for displaying twenty-eight input method letters and correspond to each other one by one.

According to the keyboard with the key position layout, input method letters are Chinese phonetic letters, calligraphical code letters, and English Latin letters, and on virtual keys of a virtual keyboard, the Chinese phonetic letters, calligraphical code letters, and English Latin letters on letter key positions are dynamically replaced to display the input method which is currently used.

Seven key positions occupy seven partitions. A location of the upper natural number key position is called an upper partition. A location of the left natural number key position is called a left partition. A location of the middle natural number key position is called a middle partition. A location of the right natural number key position is called a right partition. A location of the C key position is called a middle-left-lower partition. A location of the D key position is called a middle-right-lower partition. A location of the lower natural number key position is called a lower partition.

After an input method letter is input through one key, with the exception of upper partitions, left partitions, right partitions, lower partitions, or middle-right-lower partitions where the twenty-eight input method letters, a determining mark, a space mark, a backspace mark, and a syllable-dividing mark are located, the remaining empty upper partitions, left partitions, right partitions, lower partitions, or middle-right-lower partitions are used as candidate columns, and used for displaying words or phrases which are searched through various input methods.

The content displayed by the middle natural number key position of each key is input and realized through single clicking for the key. The content displayed by the upper natural number key position of each key is input and realized through pressing the key and holding the key to slide up. The content displayed by the left natural number key position of each key is input and realized through pressing the key and holding the key to slide left. The content displayed by the right natural number key position of each key is input and realized through pressing the key and holding the key to slide right. The content displayed by the lower natural number key position of each key is input and realized by pressing the key and holding the key to slide down. The content displayed by the C key position of each key is a key-combining function key, and a predetermined key-combining function is realized through long pressing for the key and single clicking for other related keys. The content displayed by the D key position of each key is input and realized through long pressing for the key.

According to the new Chinese phonetic scheme and the comparison table of the Chinese phonetic letters and the new characters, Latin letters Ü and Ë are added, there are twenty-eight English Latin letters and twenty-eight Chinese phonetic letters, and the Chinese phonetic letters or the new characters represent calligraphical code letters. In the new Chinese phonetic scheme, V replaces ZH, W replaces CH, Y replaces SH, and T also represents NG, U is phonetic YU, and Ë is phonetic ER. When a tone of a syllable at the end of a word is a neutral tone, tone marking is omitted. The comparison table of the Chinese phonetic letters and the new characters, a tone table, and the final table of the new Chinese phonetic scheme are shown in FIG. 1, FIG. 2, and FIG. 3.

According to the new Chinese speech classification table, the Chinese character 'bao' of a tone tuning method represents the plosive, and the Chinese character 'po' represents the affricate, the Chinese character 'ca' represents the fricative, and the Chinese character 'kai' represents the vowel, and the Chinese character 'bi' represents the nasal, as shown in FIG. 4.

Through keyboard-based adjustment of orientations of phonemes in the new Chinese speech classification table, Z, C. S. A, and D are combined into a new cross-shaped phoneme group, T also represents NG, as shown in FIG. 5.

Figure 6:
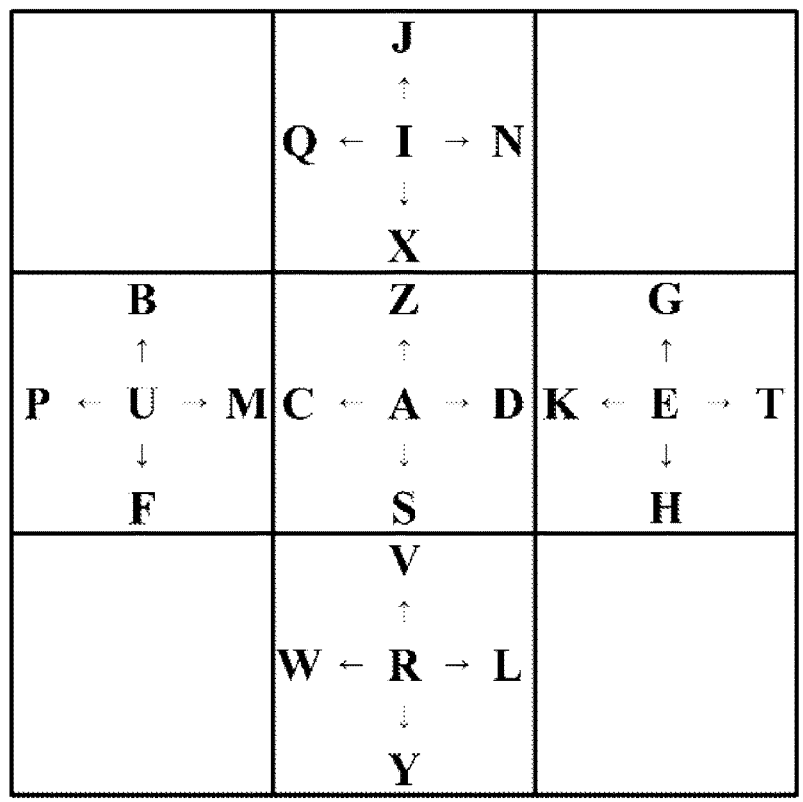
FIG. 6 is a schematic diagram of orientation exchange of a part of phonemes in the nine-key layout according to requirements, of the present invention.

In order to place the 'kai' tone in the middle of the cross shape, the positions of the 'kai' tone and the 'po' tone are interchanged, so that the 'kai' tone which is commonly used is input through single clicking, and the 'bao' tone is input through sliding up, and the 'po' tone is input through sliding left, and the 'bi' tone is input through sliding right, and the 'ca' tone is input through sliding down, as shown in FIG. 6.

According to the present invention, related speeches in the new Chinese speech classification table are associated with the key positions on the nine keys which are arranged in an array of three rows and three columns to form a new keyboard with a key position layout. Each key name is addressed by a letter name or a function name of the key position.

Figure 7:
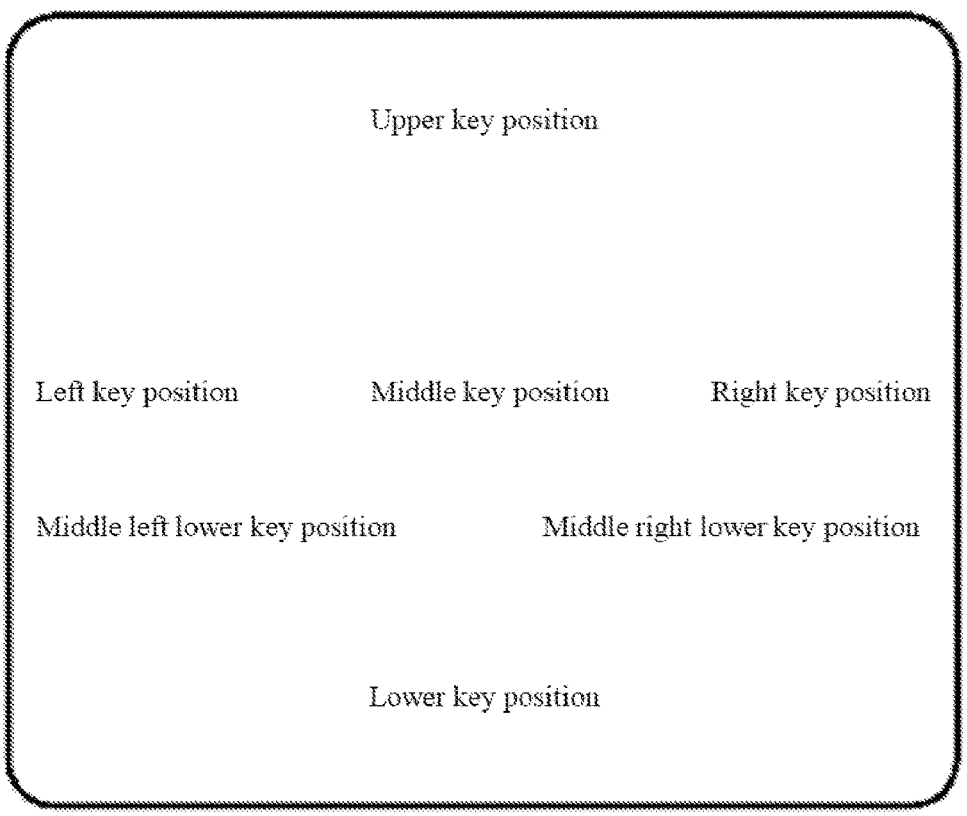
FIG. 7 is a schematic diagram of names of seven key positions on each of nine keys which are arranged in an array of three rows and three columns, of the present invention.

Each key is divided into seven key positions, and from top to bottom, and from left to right, and the seven key positions sequentially are an upper key position, a left key position, a middle key position, a right key position, a middle-left-lower key position, a middle-right-lower key position, and a lower key position, as shown in FIG. 7.

Figure 8:
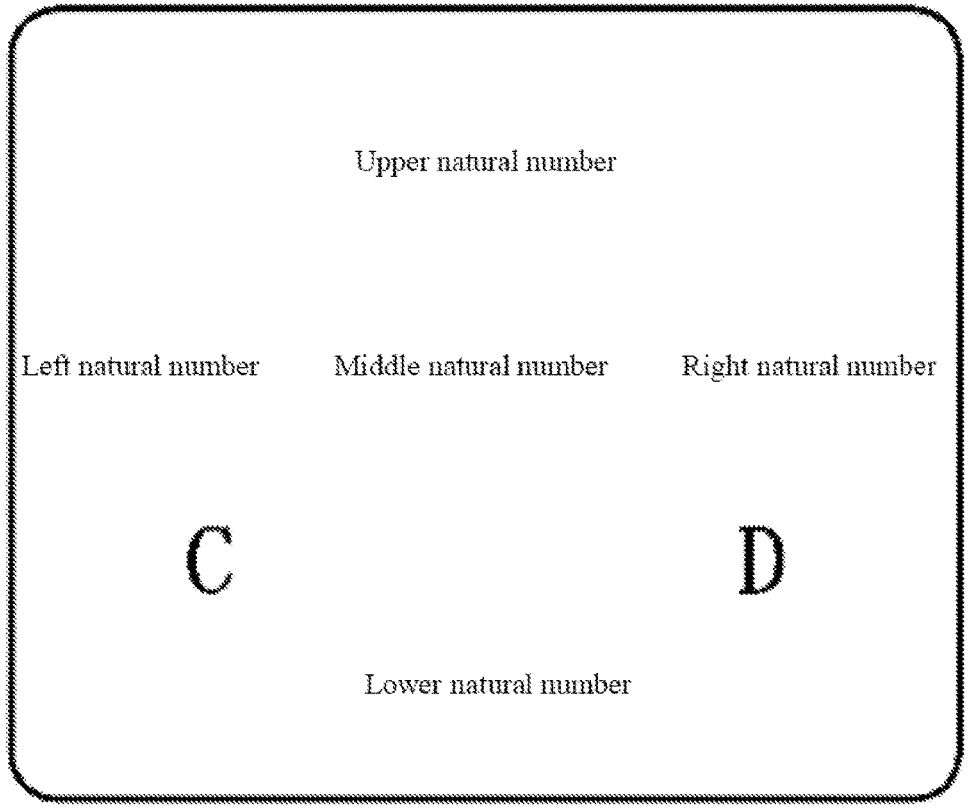
FIG. 8 is a schematic diagram of codes of seven key positions on each of nine keys which are arranged in an array of three rows and three columns, of the present invention.

From top to bottom, and from left to right, the seven key positions are also called an upper natural number key position, a left natural number key position, a middle natural number key position, a right natural number key position, a C key position, a D key position, and a lower natural number key position, as shown in FIG. 8.

Input method letters are Chinese phonetic letters, calligraphical code letters, or English Latin letters.

On virtual keys of a virtual keyboard, the Chinese phonetic letters, calligraphical code letters, and English Latin letters on letter key positions are dynamically replaced to display the input method which is currently used.

On keys of a physical keyboard, only one kind of the Chinese phonetic letters, calligraphical code letters, and English Latin letters is suitable for being displayed on the letter key positions.

As shown in FIG. 9, a number of the natural number key position of each of the nine keys which are arranged in an array with three rows and three columns is as follows, and from top to bottom, and from left to right, the numbers sequentially are:

The first row contains key positions 26, 1, and 31.
The second row contains key positions 27, 28, 29, 2, 3, 4, 32, 33, and 34.
The third row contains key positions 30, 5, and 35.
The fourth row contains key positions 6, 11, and 16.
The fifth row contains key positions 7, 8, 9, 12, 13, 14, 17, 18, and 19.
The sixth row contains key positions 10, 15, and 20.
The seventh row contains key positions 36, 21, and 41.
The eighth row contains key positions 37, 38, 39, 22, 23, 24, 42, 43, and 44, and
The ninth row contains key positions 40, 25, and 45.

EXAMPLES

A specific layout of Chinese phonetic letters on a nine-key keyboard with three rows and three columns.

The key position 1 displays J, and the key position 2 displays Q, and the key position 3 displays I, and the key position 4 displays N, and the key position 5 displays X. The key position 6 displays Z, and the key position 7 displays C, and the key position 8 displays A, and the key position 9 displays D, and the key position 10 displays S. The key position 11 displays B, and the key position 12 displays P, and the key position 13 displays U, and the key position 14 displays M. and the key position 15 displays F. The key position 16 displays G, and the key position 17 displays K, and the key position 18 displays E, and the key position 19 displays T, and the key position 20 displays H. The key position 21 displays V, and the key position 22 displays W, and the key position 23 displays R, and the key position 24 displays L, and the key position 25 displays Y.

The key position 28 displays Ü, and the key position 33 displays O, and the key position 38 displays Ë.

Other Layouts of the Examples

The key position 26 displays Esc, and the key position 27 displays editing, and the key position 29 displays a size, and the key position 30 displays editing.

The key position 31 displays Chinese-English, and the key position 32 displays a backspace mark, and the key position 34 displays Del, and the key position 35 displays Chinese-English.

The key position 36 displays a caesura sign, and the key position 37 displays the capital form, and the key position 39 displays numerical marks, and the key position 40 displays a question mark.

The key position 41 displays a sound shape, and the key position 42 displays a comma, and the key position 43 displays a space mark, and the key position 44 displays a full stop. The key position 45 displays simplified-traditional.

The key position D of the key U displays a colon, and the key position D of the key I displays settings, and the key position D of the enter key displays a semicolon.

The key position D of the key U displays screenshot capturing, and the key position D of the key A displays adding, and the key position D of the key E displays five-tone.

Figure 10:
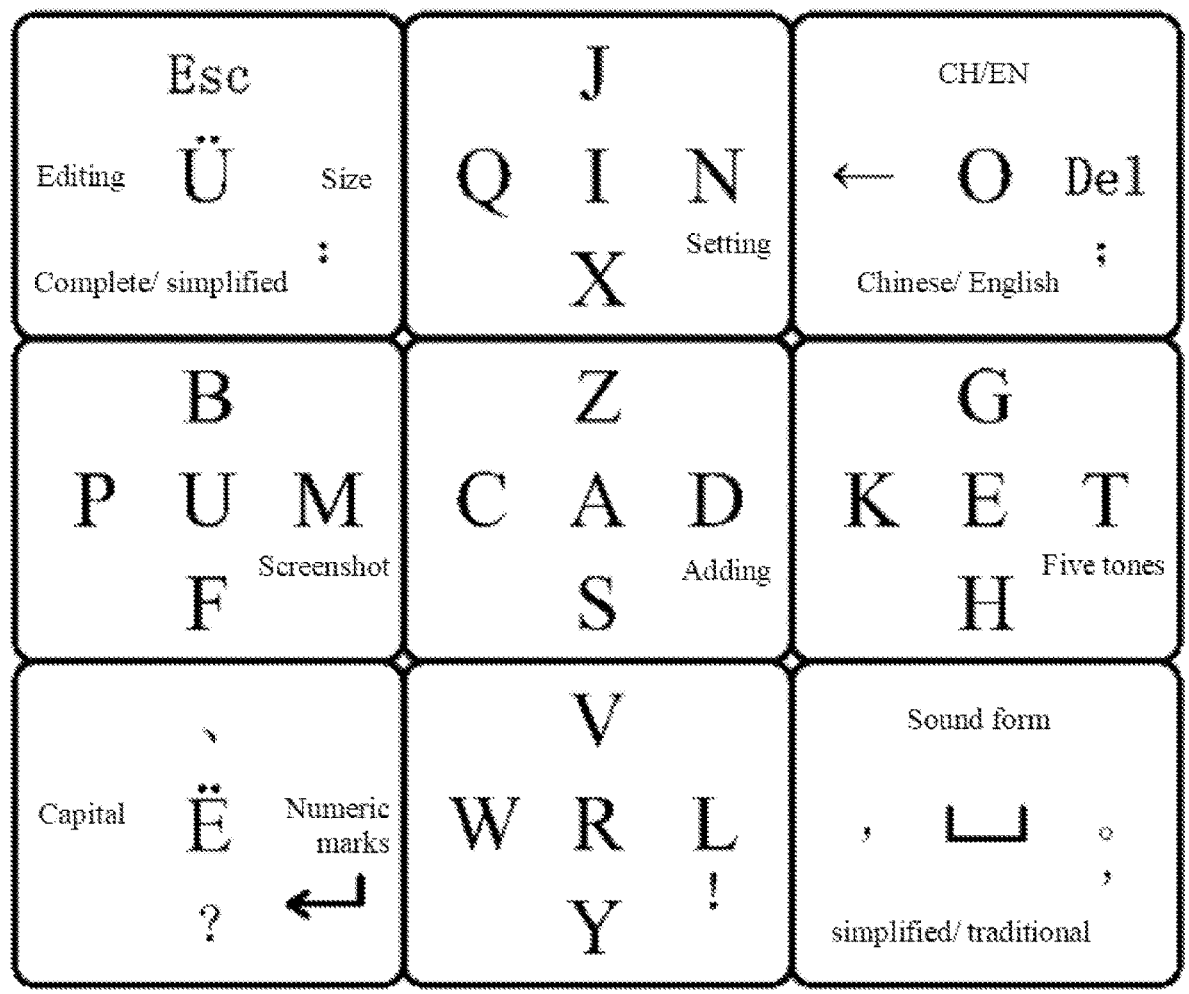
FIG. 10 is a schematic diagram of a layout of twenty-eight Chinese phonetic letters on a nine-key keyboard in the examples of the present invention.

The key position D of the key Ë displays a determining mark, and the key position D of the key R displays an exclamation mark, and the key position D of the space key displays a syllable-dividing mark, as shown in FIG. 10.

Figure 11:
FIG. 11 is a schematic diagram of a text box and a key added to the top of the nine-key keyboard in the examples of the present invention.

A ten-key keyboard is formed by adding a text box and a key to the top of the nine-key keyboard, as shown in FIG. 11.

Figure 12:
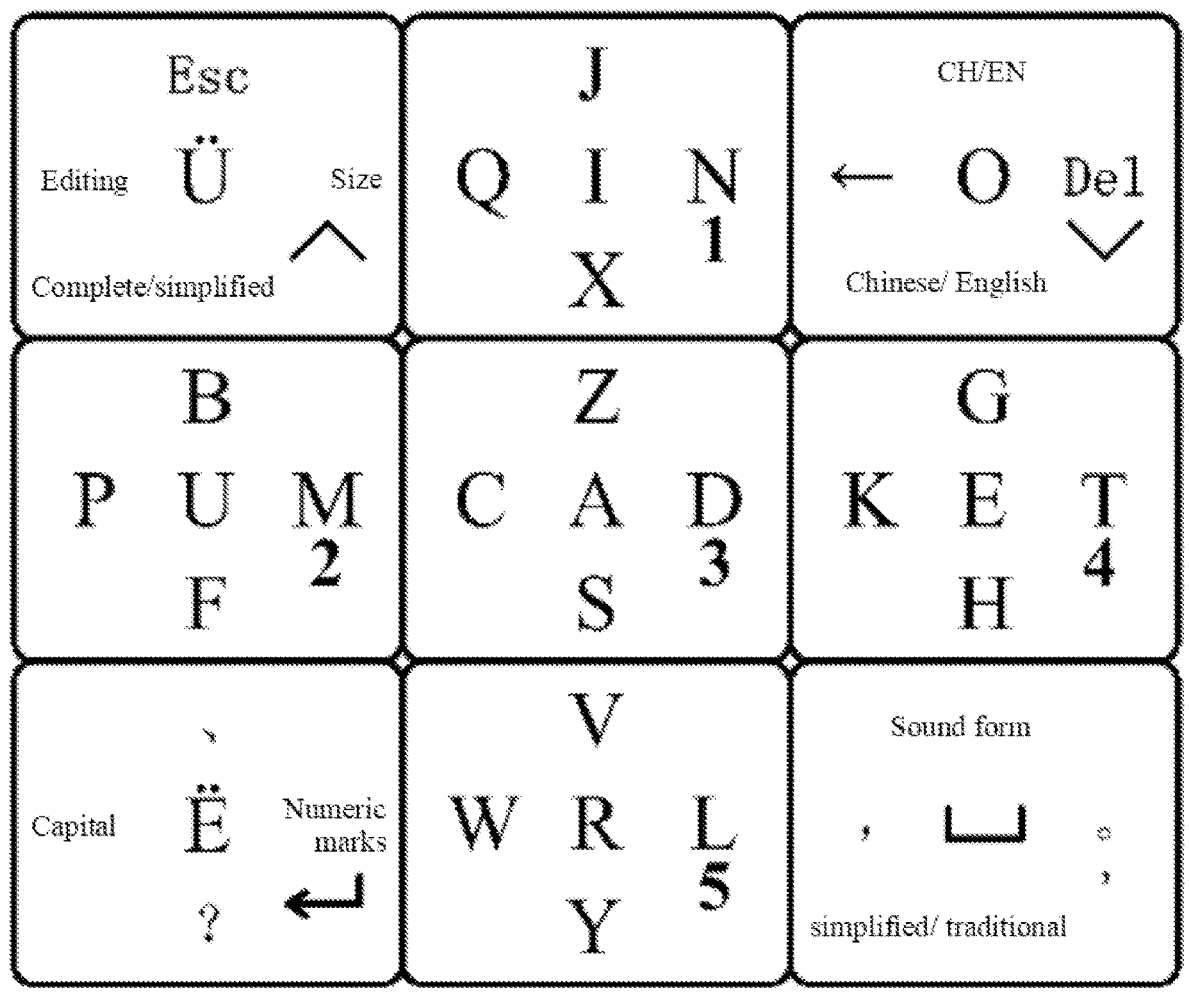
FIG. 12 is a schematic diagram of a layout of an associated word and phrase interface of the nine-key keyboard in the examples of the present invention.

The associated words or phrases are displayed in the middle-right-lower candidate columns of the keys I, U, A, E, and R, and the middle-right-lower candidate column of the key Ü displays a pull-up mark, and the middle-right-lower candidate column of the key O displays a drop-down mark, and a pull-up function and a pull-down function are only used for refreshing the associated words and phrases, as shown in FIG. 12.

Figure 13:
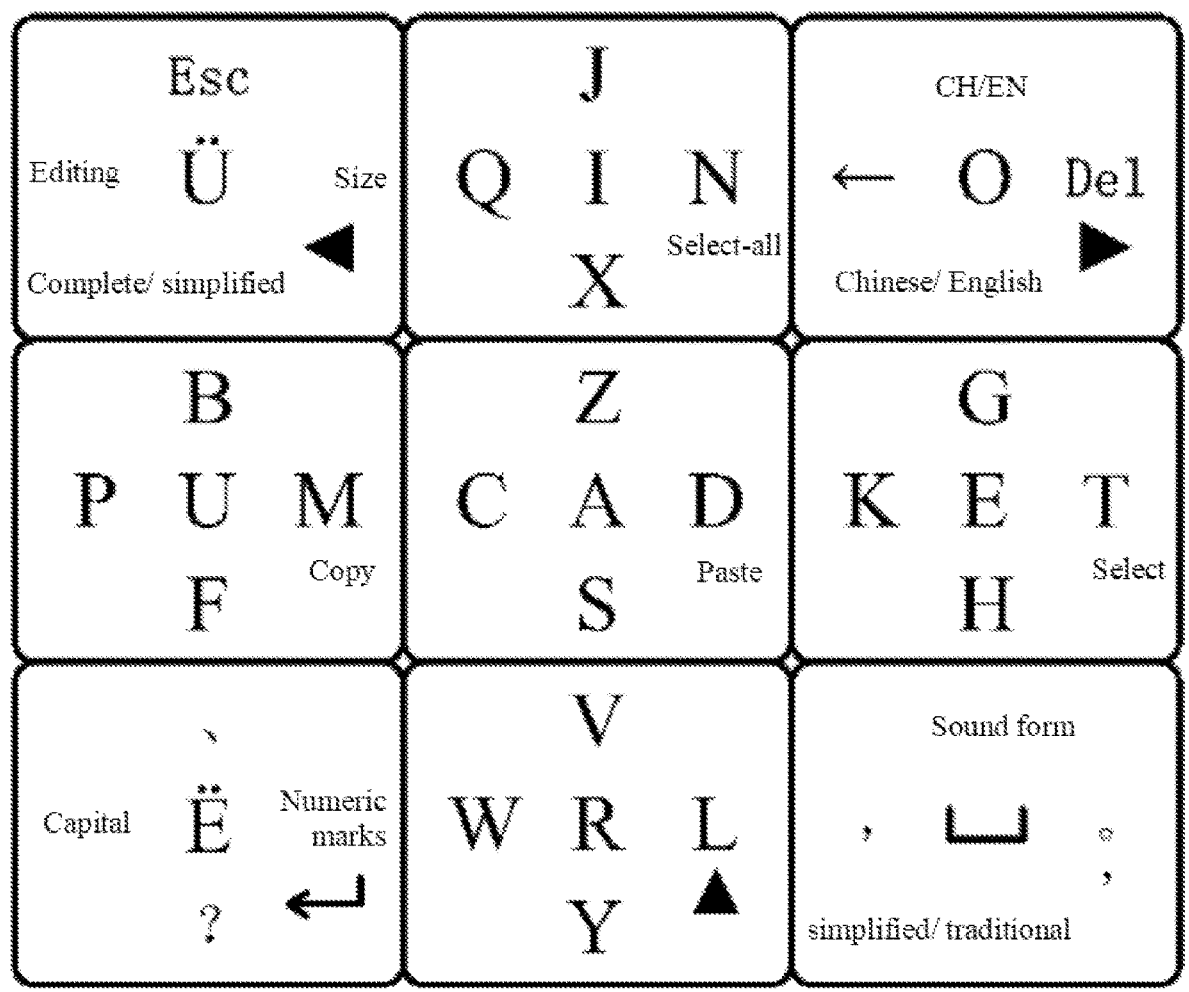
FIG. 13 is a schematic diagram of a layout of an editing interface of the nine-key keyboard in the examples of the present invention.

Numbers in FIG. 12 represent a word and phrase frequency order, and the smaller the number, the higher the frequency, the same applies below. An interface that displays the associated words and phrases can be switched into an editing interface through operating the editing key. After selecting-all or selecting, selecting-all of the key I is changed into cutting. An upward function is realized through long pressing for the key R, meanwhile, an upward mark is changed into a downward mark, at this moment, a downward function is realized by long pressing for the key R, and meanwhile, the downward mark is changed into the upward mark, that is, the upward function and the downward function are switched back and forth, as shown in FIG. 13.

A Chinese phonetic input method of the nine-key keyboard and the ten-key keyboard In the case of full-spelling input, only character strings which are actually input are displayed in the text box, and character strings in the compared original scheme and the automatically-added syllable-dividing marks are displayed in the middle-right-lower candidate column of the key O. Various display manners are determined according to an input state and a tone of each syllable.

In the case of full-spelling input, except for Ë, after a letter of the remaining twenty-seven letters is input through one key, Ë of the key Ë is changed into N, and R of the key R is changed into T. The space mark is changed into a drop-down mark, and the determining mark does not change. After the pull-down mark is used once, the determining mark is changed into a pull-up mark, and when pull-up times are equal to pull-down times, the pull-up mark is changed into the determining mark back.

In a full-spelling and syllable-dividing mark input mode, and in the case of spelling with the input letter, and the upper candidate column of the key O displays ai, and the left candidate column displays ao, and the right candidate column displays an, and the lower candidate column displays at. In a full-spelling and five-tone input mode, the candidate columns where ai, ao, an, and at are located sequentially display 1, 2, 3, and 4 or corresponding tone marks. The upper candidate column of the space key displays ou, and the left candidate column displays ian or uai, and the right candidate column displays uan, and the lower candidate column displays iat or uat.

In a Chinese phonetic full-spelling and syllable-dividing mark input mode, and after a first key is input for each syllable, twenty-eight letters are individually formed into syllables, of which twenty-seven letters are spelled together with a single vowel, single vowel parts are omitted, the case is called no-pre-spelling, and syllable-dividing marks need to be manually input. Words searched through inputting the letters ü, o, v, w, y or r are displayed in four candidate columns of a key Ü.

Words searched through inputting the letters j, i, q, n, x, z, c or s are displayed in five candidate columns of a key I.

Words searched through inputting the letters b, u, p, m or f are displayed in five candidate columns of a key U.

Words searched through inputting the letter a are displayed in five candidate columns of a key A.

Figure 14:
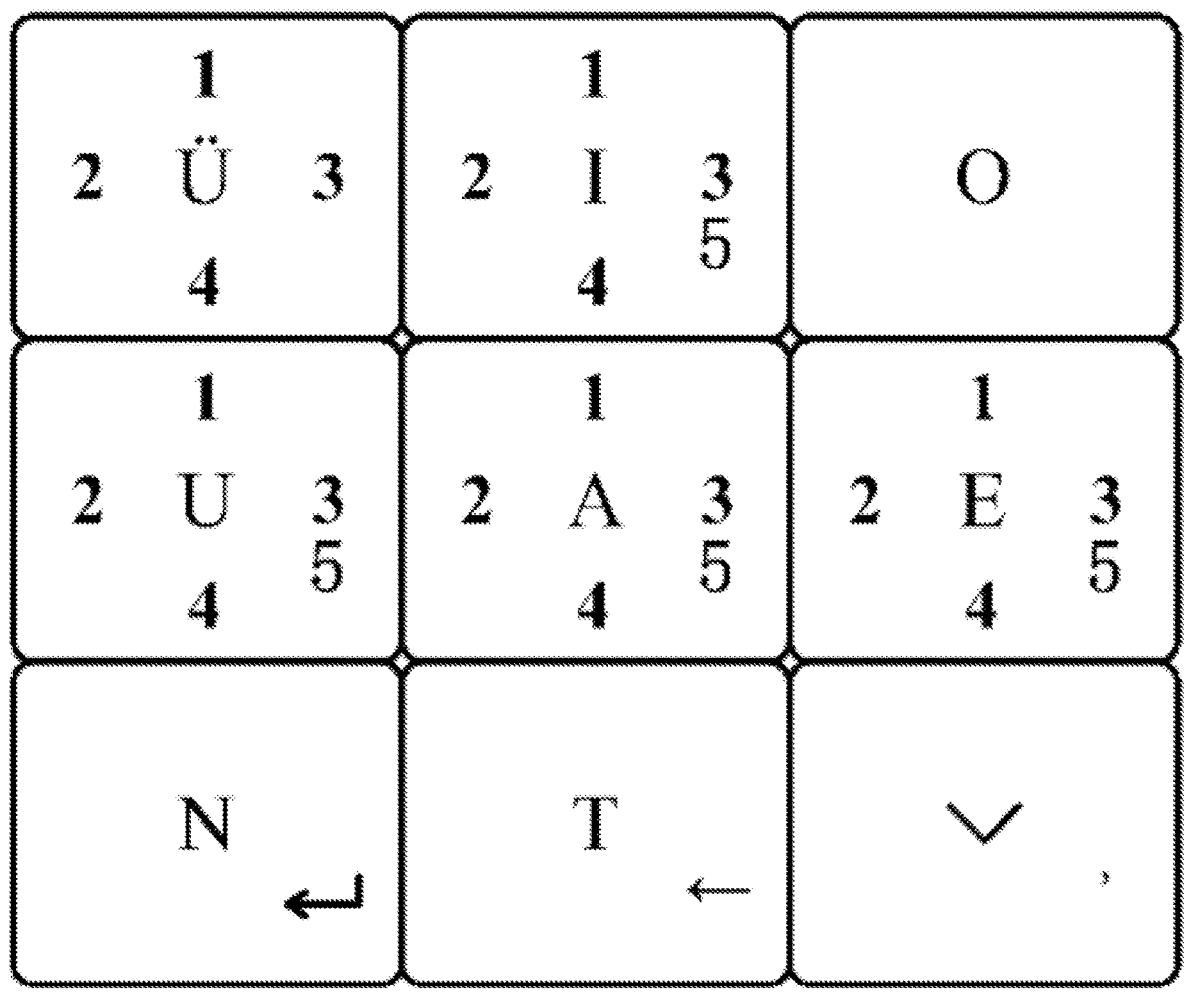
FIG. 14 is a schematic diagram of a word and phrase frequency order of no-pre-spelling of a syllable-dividing mark input mode in the Chinese phonetic input method of the nine-key keyboard.

Words searched through inputting the letters g, e, k, h, d, t or I are displayed in five candidate columns of a key E. The displaying, and the word and phrase frequency order are shown in FIG. 14.

Figure 15:
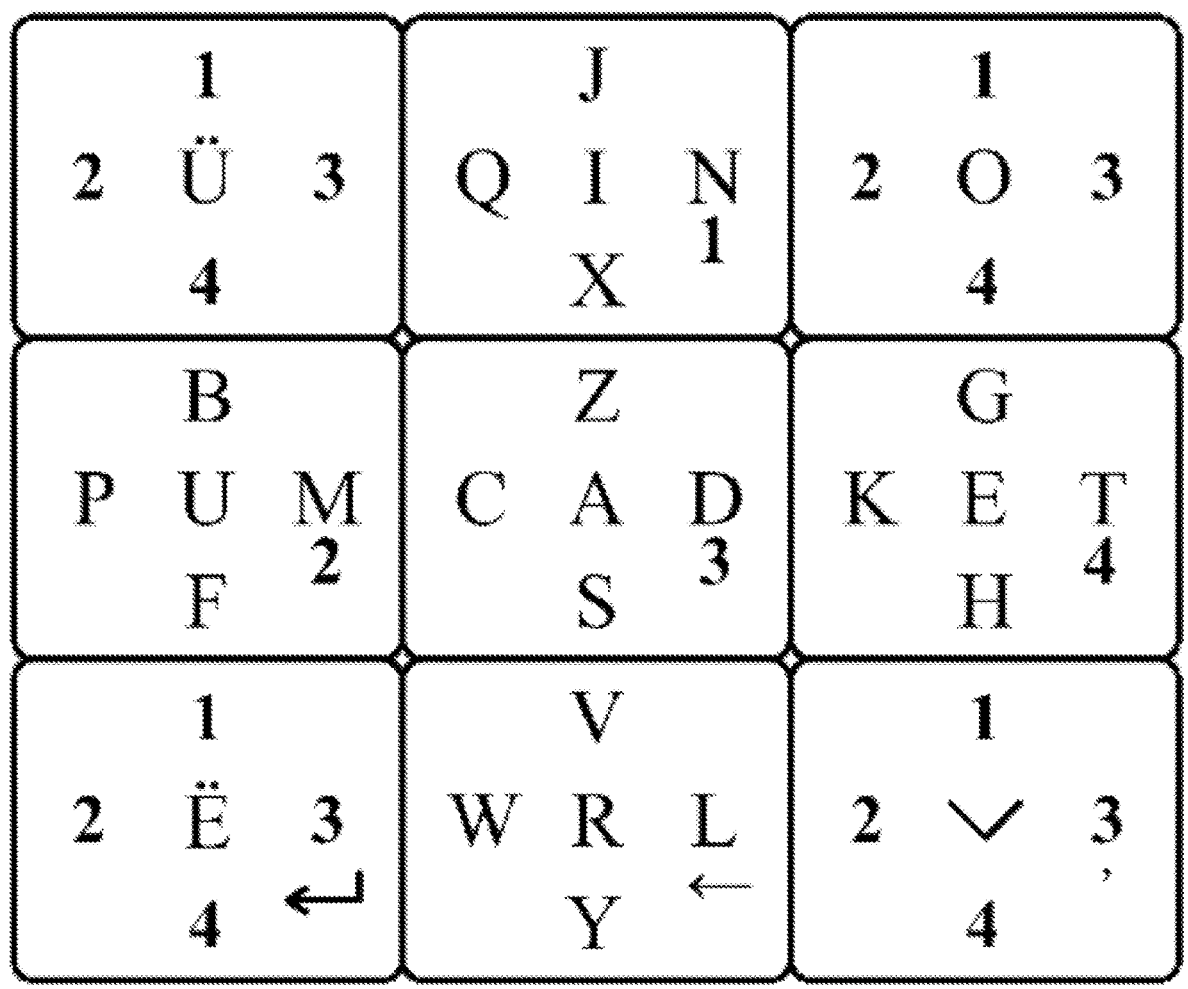
FIG. 15 is a schematic diagram of a word and phrase frequency order of a five-tone display mode after syllable-dividing marks are automatically added in the Chinese phonetic input method of the nine-key keyboard.

After another letter ë is input, ë does not be spelled with other speeches, and a syllable is completed, and a syllable-dividing mark is automatically added. The searched one-tone words are displayed in the four candidate columns of the key Ü. The searched two-tone words are displayed in the four candidate columns of a key O. The searched three-tone words are displayed in the four candidate columns of a key Ë. The searched four-tone words are displayed in the four candidate columns of a space key. The searched five-tone words are displayed in the middle-right-lower candidate columns of the keys I, U, A, and E. The displaying, and the word and phrase frequency order are shown in FIG. 15.

In a Chinese phonetic full-spelling and syllable-dividing mark input mode, and after a first key is input for each syllable, the inputted letter is fully spelled with another letter, and the case is called pre-full-spelling. Words searched through pre-full-spelling with ü or o are displayed in the four candidate columns of the key Ü.

Words searched through pre-full-spelling with i are displayed in the five candidate columns of the key I.

Words searched through pre-full-spelling with u are displayed in the five candidate columns of the key U.

Words searched through pre-full-spelling with a are displayed in the five candidate columns of the key A.

Words searched through pre-full-spelling with e are displayed in the five candidate columns of the key E.

Words searched through pre-full-spelling with n are displayed in the four candidate columns of the key Ë, and Words searched through pre-full-spelling with t are displayed in the four candidate columns of a key R. The displaying, and the word and phrase frequency order are shown in FIG. 16.

In a Chinese phonetic full-spelling and syllable-dividing mark input mode, and a second key is input for each syllable, and a syllable-dividing mark is manually input through the second key, and a five-tone display mode in FIG. 15 is applied to the case.

Figure 16:
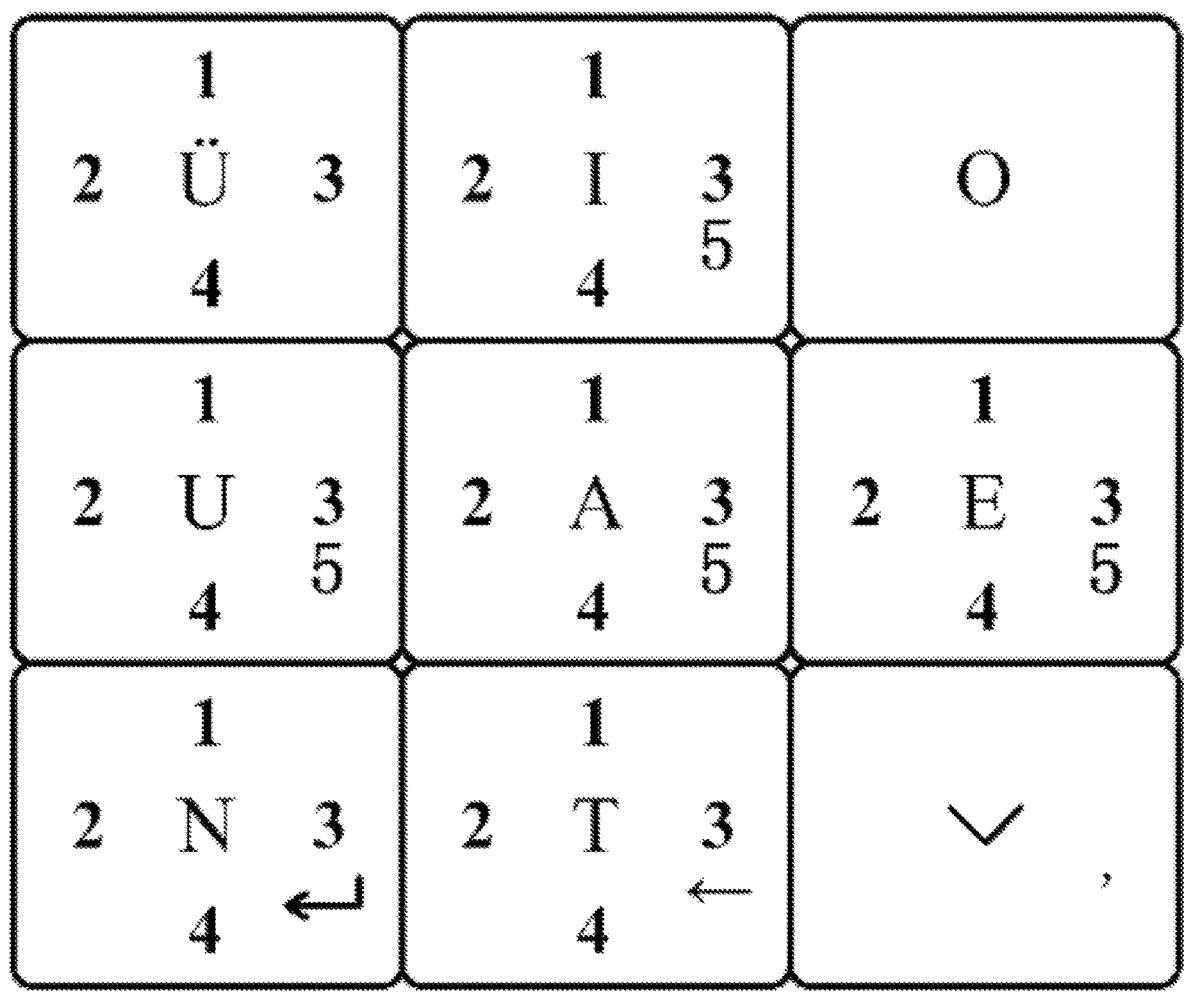
FIG. 16 is a schematic diagram of a word and phrase frequency order of pre-full-spelling of the syllable-dividing mark input mode in the Chinese phonetic input method of the nine-key keyboard.

After two keys are input, if there is further full-spelling, a pre-full-spelling display mode in FIG. 16 is applied to the case.

A syllable-dividing mark is automatically added after the second key is input, and the five-tone display mode in FIG. 15 is applied to the case.

After a third key is input for each syllable, the case is similar to the case after the second key is input for each syllable, and After a fourth key is input for each syllable, a syllable-dividing mark is automatically added, and the five-tone display mode in FIG. 15 is applied.

In a Chinese phonetic full-spelling and five-tone input mode, a flat tone mark or 1 is displayed in the upper candidate column of the key O, and a rising tone mark or 2 is displayed in the left candidate column of the key O, and the falling-rising tone mark or 3 is displayed in the right candidate column of the key O, and the falling tone mark or 4 is displayed in the lower candidate column of the key O, and finals displayed in the four candidate columns in the full-spelling and syllable-dividing mark input mode are replaced.

Figure 17:
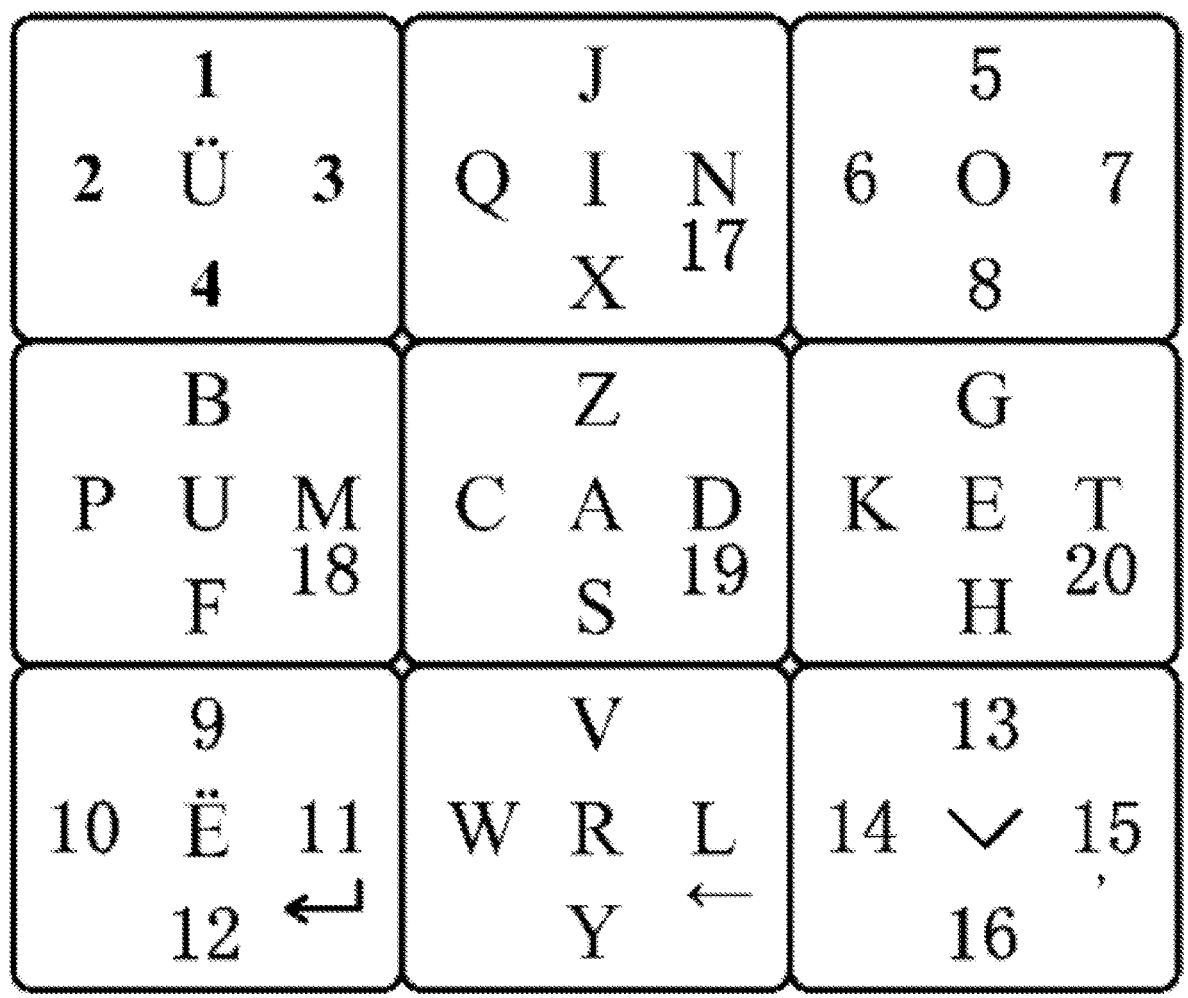
FIG. 17 is a schematic diagram of a word and phrase frequency order of simplified-spelling in the Chinese phonetic input method of the nine-key keyboard.

In a Chinese phonetic simplified-spelling input mode, regardless of the key input for each syllable, words are displayed in all the empty candidate columns in a phrase frequency order, as shown in FIG. 17.

In the case of Chinese phonetic full-spelling input, and when words exceed a certain number of syllables, regardless of the no-pre-spelling display mode, the five-tone display mode, or the pre-full-spelling display mode, and the words cannot be completely displayed in the left candidate columns, the right candidate columns, and the middle-right-lower candidate columns, but are displayed in the upper candidate columns and the lower candidate columns, and in the phrase frequency order, the upper candidate columns are 1, and the lower candidate columns are 2.

A calligraphical code input method of the nine-key keyboard and the ten-key keyboard Change rules of function marks and symbols in the associative word interface, the editing interface, and the input process are the same as those of the Chinese phonetic input method.

The twenty-eight Latin letters in the Chinese phonetic scheme represent calligraphical code words, and each Latin letter represents a key code. Each Chinese character can be coded up to eight times, and in a coding order, a first key code is formed through the first-time coding and the second-time coding, and a second key code is formed through the third-time coding and the fourth-time coding, and a third key code is formed through the fifth-time coding and the sixth-time coding, and a fourth key code is formed through the seventh-time coding and the eighth-time coding. Spelling of the first key codes of each Chinese character is called simplified spelling of the calligraphical codes, and spelling of the first key code, the second key code, the third key code, and the fourth key code of each Chinese character is called full spelling of the calligraphical codes.

Figure 18:
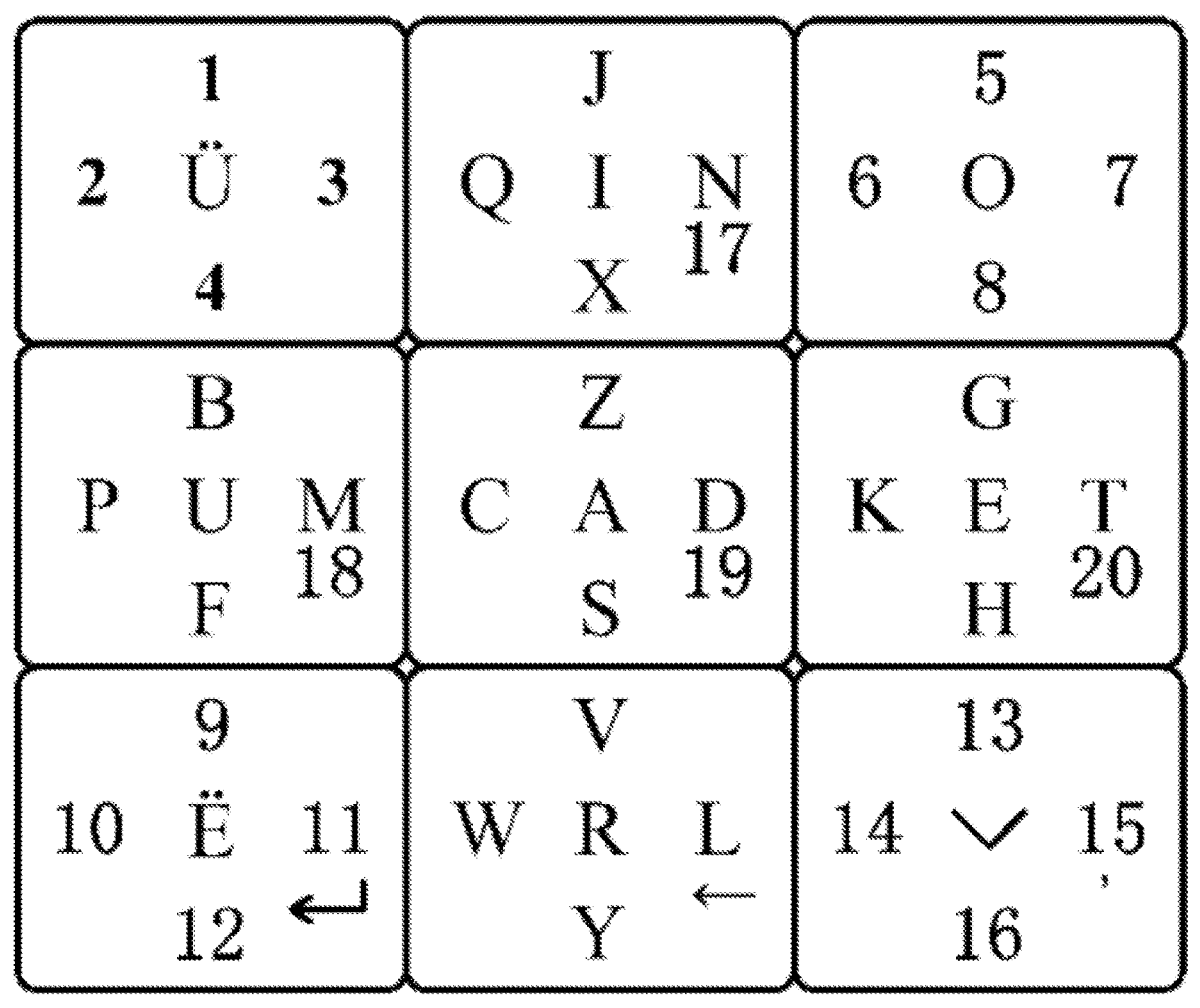

Full-spelling or simplified-spelling is determined at first, and words are searched according to word and phrase frequency, and the words with high word and phrase frequency are prioritized to be displayed. Regardless of full-spelling and simplified-spelling, the words are displayed in all the empty candidate columns in a word and phrase frequency order, as shown in FIG. 18.

An English input method of the nine-key keyboard and the ten-key keyboard

Figure 19:
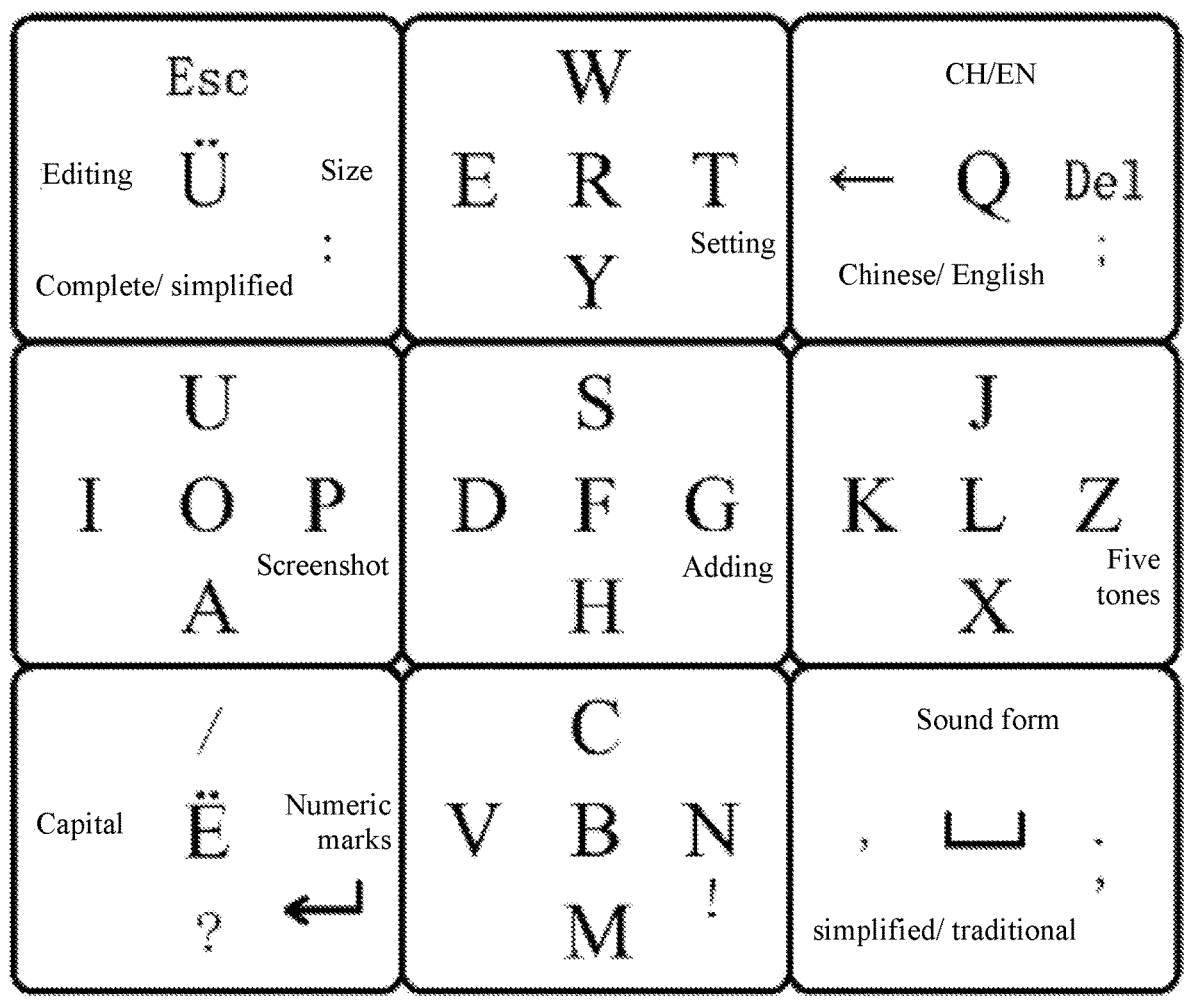
FIG. 19 is a schematic diagram of a layout of twenty-eight English letters on the nine-key keyboard.

An initial interface is changed into English characters, and change rules of function marks and symbols in the associative word interface, the editing interface, and the input process are the same as those of the Chinese phonetic input method, and the other function keys are the same, as shown in FIG. 19.

Figure 20:
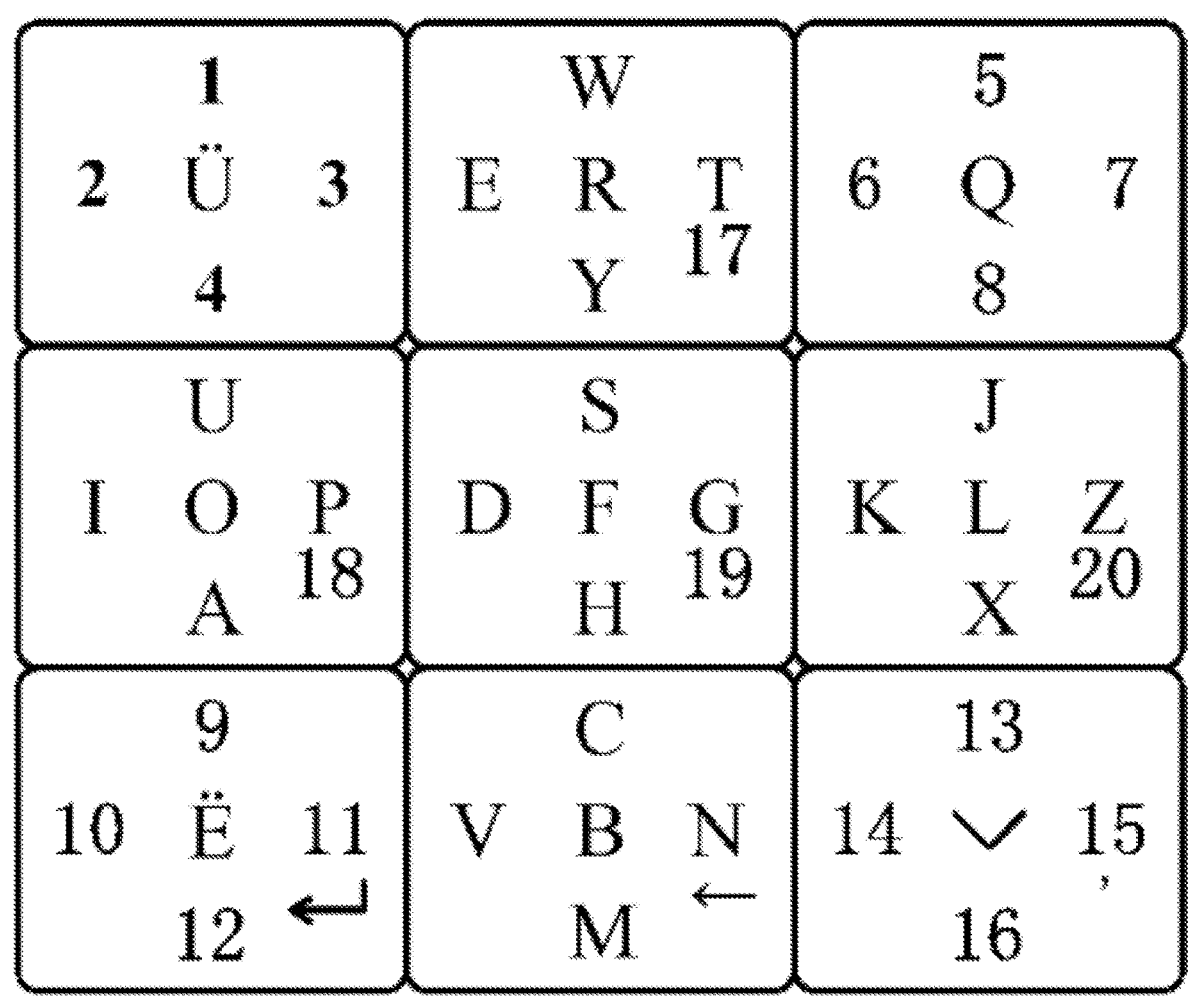

After a letter is input through one key, English words starting with the letter are searched according to word frequency, and the words with high word frequency are prioritized to be displayed, and subsequent letter strings of the input letter are displayed in all the empty candidate columns in a word frequency order, as shown in FIG. 20.

Figure 21:
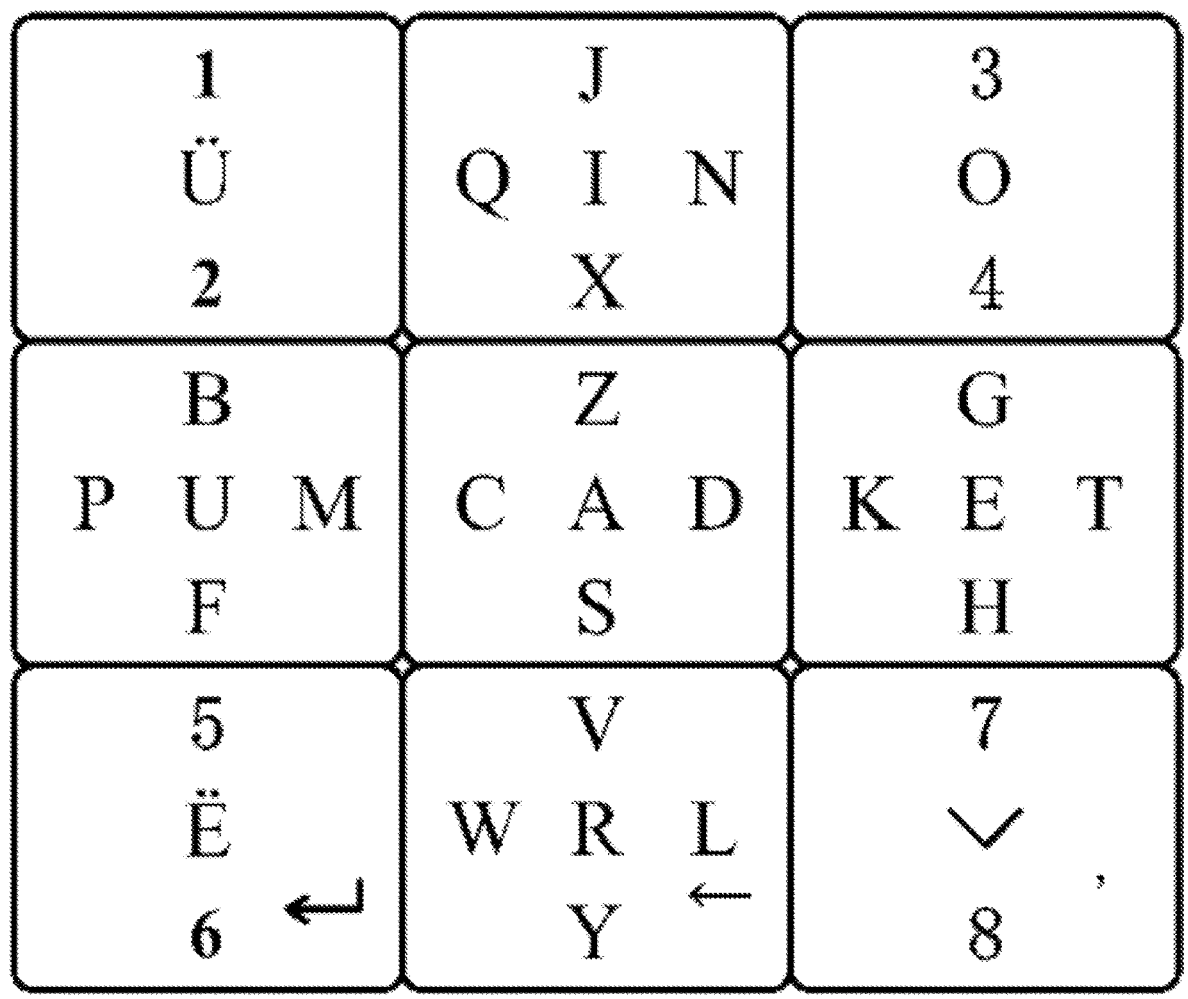
FIG. 21 is a schematic diagram of a word and phrase frequency order when words exceed a certain number of Chinese characters or letters in the case of Chinese phonetic simplified-spelling input, calligraphical code simplified-spelling or full-spelling input and English input.

Regardless of Chinese phonetic simplified-spelling input, calligraphical code simplified-spelling or full-spelling input and English input, and when words exceed a certain number of Chinese characters or letters, and the words cannot be completely displayed in the left candidate columns, the right candidate columns, and the middle-right-lower candidate columns, but are displayed in the upper candidate columns and the lower candidate columns. The displaying, and the word and phrase frequency order are shown in FIG. 21.

The present invention and the implementation manners thereof are described above, the description is not limited, the content shown in the drawings is only one of the implementation manners of the present invention, and the actual examples are not limited thereto. In summary, if those of ordinary skill in the art are inspired by the present invention, and uncreatively design structural manners and examples which are similar to the technical solution, without departing from the purpose of the present invention, the structural manners and examples should fall within the scope of protection of the present invention.

What is claimed is:

1. A keyboard with a key position layout, comprising:
a keyboard body;
wherein the keyboard body is provided with a main key area formed by nine keys;
the nine keys are arranged in an array of three rows and three columns, and each key is divided into seven key positions, and from top to bottom, and from left to right, the seven key positions sequentially are an upper natural number key position, a left natural number key position, a middle natural number key position, a right natural number key position, a middle left lower key position, a middle right lower key position, and a lower natural number key position; and
in the main key area, twenty-eight letter key positions are provided, all the natural number key positions of the five keys arranged in a cross shape, and the middle natural number key positions of the other three keys, and the twenty-eight letter key positions are used for displaying twenty-eight input method letters and correspond to each other one by one.

2. An input method of the keyboard with the key position layout applied to an electronic device, wherein the keyboard with the key position layout according to claim 1 is used;
input method letters are Chinese phonetic letters, calligraphical code letters, and English Latin letters, and on virtual keys of a virtual keyboard, the Chinese phonetic letters, calligraphical code letters, and English Latin letters on letter key positions are dynamically replaced to display the input method which is currently used;
the seven key positions occupy seven partitions; a location of the upper natural number key position is called an upper partition; a location of the left natural number key position is called a left partition; a location of the middle natural number key position is called a middle partition; a location of the right natural number key position is called a right partition; a location of the middle left lower key position is called a middle-left-lower partition; a location of the middle right lower key position is called a middle-right-lower partition; a location of the lower natural number key position is called a lower partition;
after an input method letter is input through one key, with exception of the upper partitions, the left partitions, the right partitions, the lower partitions, or the middle-right-lower partitions where the twenty-eight input method letters, a determining mark, a space mark, a backspace mark, and a syllable-dividing mark are located, remaining empty upper partitions, left partitions, right partitions, lower partitions, or middle-right-lower partitions are used as candidate columns, and used for displaying words or phrases which are searched through various input methods;
a content displayed by the middle natural number key position of each key is input and realized through single clicking for the key; a content displayed by the upper natural number key position of each key is input and realized through pressing the key and holding the key to slide up; a content displayed by the left natural number key position of each key is input and realized through pressing the key and holding the key to slide left; a content displayed by the right natural number key position of each key is input and realized through pressing the key and holding the key to slide right; a content displayed by the lower natural number key position of each key is input and realized by pressing the key and holding the key to slide down; a content displayed by the middle left lower key position of each key is a key-combining function key, and a predetermined key-combining function is realized through long pressing for the key and single clicking for other related keys; and a content displayed by the middle right lower key position of each key is input and realized through long pressing for the key.

3. The input method of the keyboard with the key position layout applied to the electronic device according to claim 2, wherein in a Chinese phonetic full-spelling and syllable-dividing mark input mode, and after a first key is input for each syllable, and the twenty-eight letters are individually formed into syllables, of which twenty-seven letters are spelled together with a single vowel, the single vowel parts are omitted, a case is called no-pre-spelling, and the syllable-dividing marks need to be manually input; words searched through inputting the letters ü, o, v, w, y or r are displayed in four candidate columns of a key Ü;

words searched through inputting the letters j, i, q, n, x, z, c or s are displayed in five candidate columns of a key I;

words searched through inputting the letters b, u, p, m or f are displayed in five candidate columns of a key U;

words searched through inputting the letter a are displayed in five candidate columns of a key A;

words searched through inputting the letters g, e, k, h, d, t or l are displayed in five candidate columns of a key E;

after another letter ë is input, ë does not be spelled with other speeches, and a syllable is completed, and the syllable-dividing mark is automatically added; the searched one-tone words are displayed in the four candidate columns of the key Ü; the searched two-tone words are displayed in the four candidate columns of a key O; the searched three-tone words are displayed in the four candidate columns of a key Ë; the searched four-tone words are displayed in the four candidate columns of a space key; and the searched five-tone words are displayed in the middle-right-lower candidate columns of the keys I, U, A, and E.

4. The input method of the keyboard with the key position layout applied to the electronic device according to claim 2, wherein in a Chinese phonetic full-spelling and syllable-dividing mark input mode, and after a first key is input for each syllable, and the inputted letter is fully spelled with another letter, and the case is called pre-full-spelling;

words searched through pre-full-spelling with ü or o are displayed in the four candidate columns of the key Ü;

words searched through pre-full-spelling with i are displayed in the five candidate columns of the key I;

words searched through pre-full-spelling with u are displayed in the five candidate columns of the key U;

words searched through pre-full-spelling with a are displayed in the five candidate columns of the key A;

words searched through pre-full-spelling with e are displayed in the five candidate columns of the key E;

words searched through pre-full-spelling with n are displayed in the four candidate columns of the key Ë; and words searched through pre-full-spelling with t are displayed in the four candidate columns of a key R.

5. The input method of the keyboard with the key position layout applied to the electronic device according to claim 2, wherein in a Chinese phonetic full-spelling and syllable-dividing mark input mode, and a second key is input for each syllable, and a syllable-dividing mark is manually input through the second key, and a five-tone display mode is applied to a case;

after two keys are input, and if there is further full-spelling, a pre-full-spelling display mode is applied to the case;

a syllable-dividing mark is automatically added after the second key is input, and a five-tone display mode is applied to the case;

after a third key is input for each syllable, and the case is similar to the case after the second key is input for each syllable; and after a fourth key is input for each syllable, and a syllable-dividing mark is automatically added, and a five-tone display mode is applied to the case.

6. The input method of the keyboard with the key position layout applied to the electronic device according to claim 2, wherein in a Chinese phonetic full-spelling and five-tone input mode, and a flat tone mark or 1 is displayed in the upper candidate column of the key O, and a rising tone mark or 2 is displayed in the left candidate column of the key O, and falling-rising tone mark or 3 is displayed in the right candidate column of the key O, and the falling tone mark or 4 is displayed in the lower candidate column of the key O, and finals displayed in four candidate columns in the full-spelling and syllable-dividing mark input mode are replaced.

7. The input method of the keyboard with the key position layout applied to the electronic device according to claim 2, wherein in a Chinese phonetic simplified-spelling input mode, regardless of the key input for each syllable, words are displayed in all empty candidate columns in a phrase frequency order.

8. The input method of the keyboard with the key position layout applied to the electronic device according to claim 2, wherein in case of Chinese phonetic full-spelling input, and when words exceed a certain number of syllables, regardless of no-pre-spelling display mode, five-tone display mode, or pre-full-spelling display mode, the words cannot be completely displayed in the left candidate columns, the right candidate columns, and the middle-right-lower candidate columns, but are displayed in the upper candidate columns and the lower candidate columns, and in phrase frequency order, the upper candidate columns are 1, and the lower candidate columns are 2.

9. The input method of the keyboard with the key position layout applied to the electronic device according to claim 2, wherein in case of calligraphical code input, and full-spelling or simplified-spelling is determined at first, and words are searched according to word and phrase frequency, and the words with high word and phrase frequency are prioritized to be displayed; regardless of full-spelling and simplified-spelling, and the words are displayed in all the empty candidate columns in a word and phrase frequency order.

10. The input method of the keyboard with the key position layout applied to the electronic device according to claim 2, wherein in case of the English input, and after a letter is input through one key, and English words starting with the letter are searched according to word frequency, and the words with high word frequency are prioritized to be displayed; and subsequent letter strings of the input letter are displayed in all the empty candidate columns in a word frequency order.

11. The input method of the keyboard with the key position layout applied to the electronic device according to claim 2, wherein regardless of Chinese phonetic simplified-spelling input, calligraphical code simplified-spelling or full-spelling input and English input, and when words exceed a certain number of Chinese characters or letters, and the words cannot be completely displayed in the left candidate columns, the right candidate columns, and the middle-right-lower candidate columns, but are displayed in the upper candidate columns and the lower candidate columns.

\* \* \* \* \*